(12) United States Patent
Liu

(10) Patent No.: US 6,976,297 B1
(45) Date of Patent: Dec. 20, 2005

(54) WRENCH FOR AN ENGINE CLUTCH OF A RADIO CONTROL MODEL

(76) Inventor: Nai Wen Liu, P.O. Box 63-150, Taichung City (406) (TW)

( * ) Notice: Subject to any disclaimer, the term of this patent is extended or adjusted under 35 U.S.C. 154(b) by 0 days.

(21) Appl. No.: 10/947,414

(22) Filed: Sep. 23, 2004

(30) Foreign Application Priority Data

Jun. 21, 2004 (TW) ............... 93209735 U

(51) Int. Cl.⁷ ............................................. B25B 27/00
(52) U.S. Cl. ......................................... 29/270; 29/271
(58) Field of Search .................. 29/270, 271, 276, 29/278; 269/3, 6, 95

(56) References Cited

U.S. PATENT DOCUMENTS 6,510,599 B2 * 1/2003 AmRhein .................. 29/426.1

6,889,968 B1 * 5/2005 Wong ........................... 269/91

* cited by examiner

Primary Examiner—Lee D. Wilson

(57) ABSTRACT

A wrench for an engine clutch of a radio control model includes a handle having a receiving space longitudinally defined in the handle. A control unit is rotatably mounted in the receiving space, and includes a first end formed with a press portion and a second end formed with a hook. The press portion presses a centrifugal lever of the engine clutch when mounting and the hook engages to the centrifugal lever when detaching. A drive unit is pivotally mounted to one end of the handle and corresponds to the press portion. The drive unit includes a hole defined in a free end thereof for receiving an input shaft of the engine clutch. A partition is securely laterally attached to the drive unit and has a separation extending therefrom. The separation is provided for easily detaching/mounting a torsion spring of the engine clutch.

15 Claims, 10 Drawing Sheets

WRENCH FOR AN ENGINE CLUTCH OF A RADIO CONTROL MODEL

BACKGROUND OF THE INVENTION

1. Field of the Invention

The present invention relates to a wrench, and more particularly to a wrench for an engine clutch of a radio control model.

2. Description of Related Art

The power from the engine of a radio control model is transmitted to the drive device via a clutch. With reference to FIG. 10, the clutch includes a seat (1) having an input shaft (2) centrally longitudinally mounted to the seat (1) and connected to the engine of the radio control model. Three stubs (3) extend from the seat (1) opposite to the engine and respectively radially correspond to the input shaft (2). One of the three stub (3) has a centrifugal lever (4) pivotally sleeved thereon. The centrifugal lever (4) includes a through hole (4A) longitudinally defined in one side of the centrifugal lever (4) and a slot (4B) laterally defined to perpendicularly communicate with the through hole (4A). The through hole (4A) is sleeved on a corresponding one of the three stubs (3) after a torsion spring (5) being disposed in the slot (4B) and the corresponding stub (3) extending through the torsion spring (5) for positioning the torsion spring (5). The torsion spring (5) has a first end (5A) and a second end (5B) respectively engaged to the input shaft (2) and the centrifugal lever (4).

The centrifugal lever (4) is outwardly wiggled due to the centrifugal force due to the rotating seat (1) that is drive by the input shaft (2). The wiggled centrifugal lever (4) is engaged to an inner periphery of a coupling (not shown) for driving the coupling due to the friction force between the wiggled lever (4) and the coupling. The centrifugal lever (4) is disengaged from the coupling when the seat (1) is stopped.

The centrifugal lever (4) is easily worn out because the radio control model is usually operated in a high speed. Consequently, the user frequently needs to exchange the worn centrifugal lever (4). However, the centrifugal lever (4) of the clutch of the radio control model is a very small part such that the user difficultly uses the ordinary hand tool, such as pliers and screwdriver, to exchange the worn centrifugal lever. A unique tool is necessary to conveniently exchange the centrifugal lever (4) of the engine clutch of a radio control model.

The present invention has arisen to mitigate and/or obviate the disadvantages of the conventional hand tools that are difficultly used to exchange the worn centrifugal lever.

SUMMARY OF THE INVENTION

The main objective of the present invention is to provide an improved wrench for an engine clutch of a radio control model. The wrench can easily detach/mount a centrifugal lever of the engine clutch.

To achieve the objective, the wrench in accordance with the present invention comprises a handle having a receiving space longitudinally defined in the handle. A control unit is rotatably mounted in the receiving space, and includes a first end formed with a press portion and a second end formed with a hook. The press portion presses a centrifugal lever of the engine clutch when mounting and the hook engages to the centrifugal lever when detaching. A drive unit is pivotally mounted to one end of the handle and corresponds to the press portion. The drive unit includes a hole defined in a free end thereof for receiving an input shaft of the engine clutch.

A partition is securely laterally attached to the drive unit and has a separation extending therefrom. The separation is provided for easily detaching/mounting a torsion spring of the engine clutch.

Further benefits and advantages of the present invention will become apparent after a careful reading of the detailed description with appropriate reference to the accompanying drawings.

DETAILED DESCRIPTION OF THE INVENTION

Figure 1:
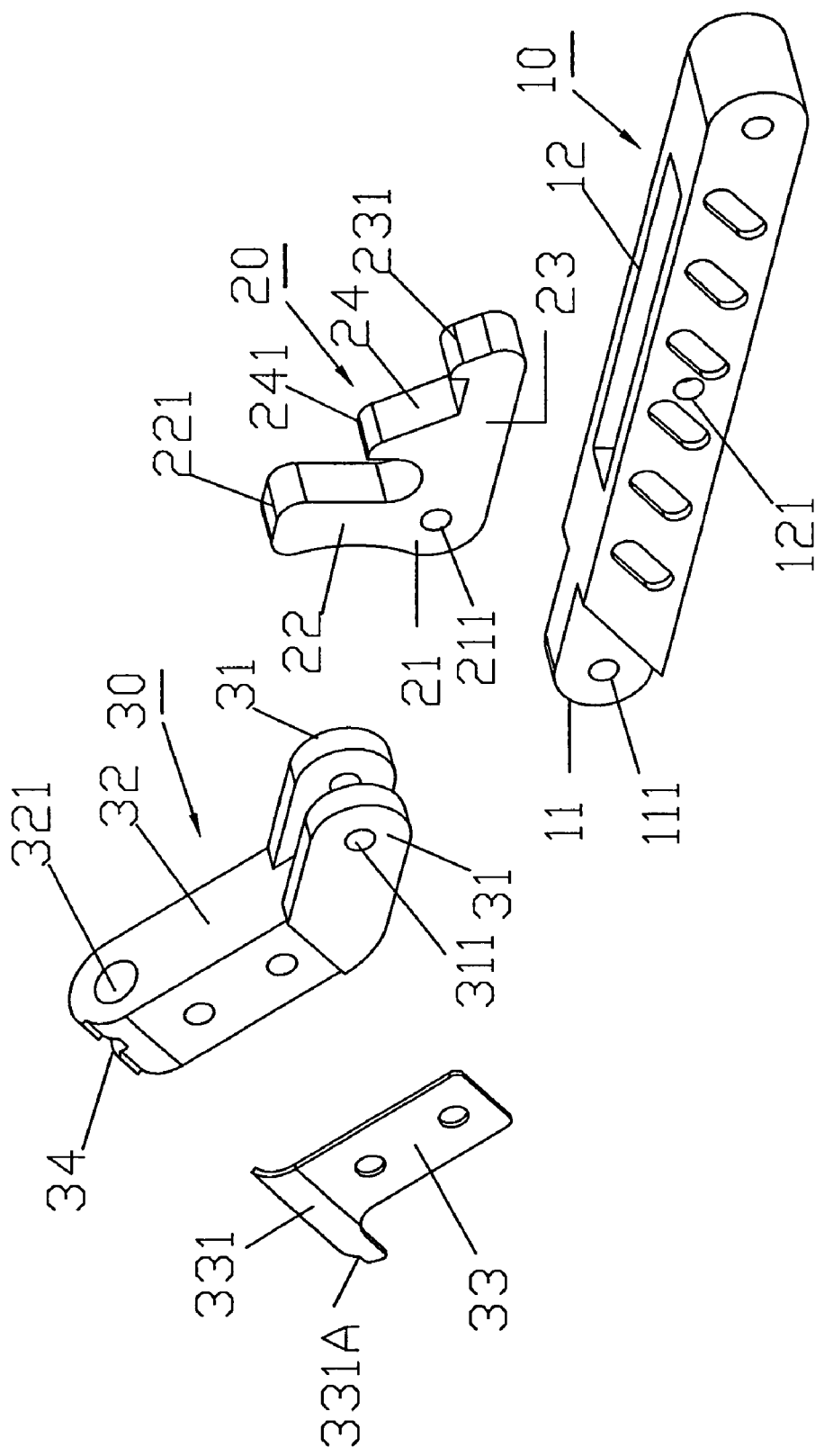
FIG. 1 is an exploded perspective view of a wrench for an engine clutch of a radio control model in accordance with the present invention.
Figure 2:
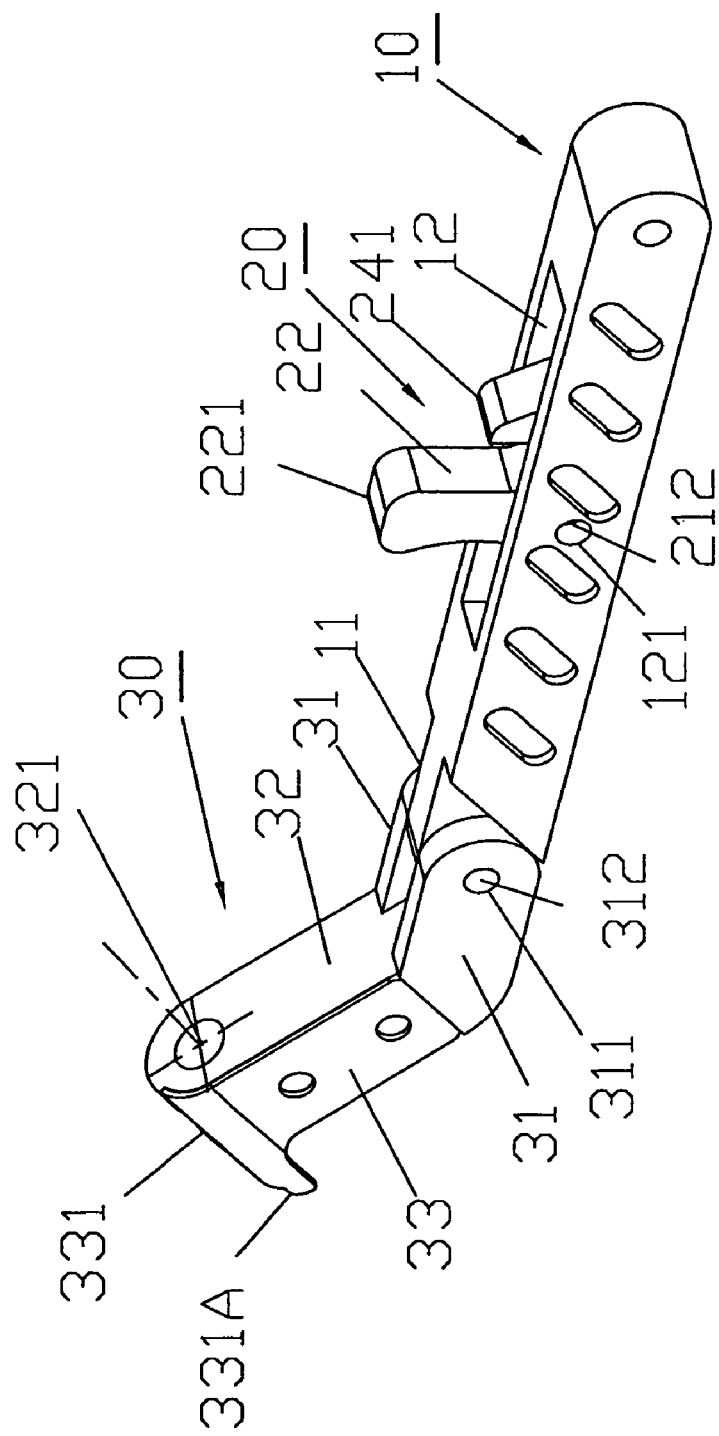
FIG. 2 is a perspective view of a wrench for an engine clutch of a radio control model in accordance with the present invention.

Referring to the drawings and initially to FIGS. 1 and 2, a wrench for an engine clutch of a radio control model in accordance with the present invention comprises handle (10), a control unit (20) pivotally mounted in a middle portion of the handle (10) and a drive unit (30) pivotally connected to one end of the handle (10).

The handle (10) includes an extension (11) longitudinally extending from one end of the handle (10) and having a through hole (111) laterally extending through the extension (11). A receiving space (12) is longitudinally defined in the middle portion of the handle (10). A pivot hole (121) is defined in the middle portion of the handle (10) and laterally extends through the handle (10).

The control unit (20) is partially pivotally received in the receiving space (12) in the handle (10). In the preferred embodiment of the present invention, the control unit (20) has an F-shape. The control unit (20) includes shank (23) having a first end (21) formed with a second through hole (211) and a second end formed with a hook (231). The second through hole (211) laterally extends through the control unit (20). The second through hole (211) aligns with the pivot hole (121), and a first pin (212) extends pivot hole (121) and the second through hole (211) to pivotally mount the control unit (20) in the receiving space (12) in the handle (10). A first protrusion (22) perpendicularly extends from the first end (21) of the shank (23) and a press portion (221) is formed on a distal end of the first protrusion (22). A second protrusion (24) extends from a middle portion of the shank (23) and parallels with the first protrusion (22) such that the shank (23), the first protrusion (22) and the second protrusion (24) form the F-shape of the control unit (20). A position portion (241) is formed on a distal end of the second protrusion (24).

The drive unit (30) is an angled element. The drive unit (30) has a first end formed with a pair of second ears (31). A third through hole (311) is defined in the pair of ears (31) and laterally extends through the pair of ears (31). The third through hole (311) aligns with the first through hole (111) such that drive unit (30) is pivotally mounted to the extension (11) of the handle (10) and corresponds to the first protrusion (22) of the control unit (20) when a second pin (312) orderly extends through the third through hole (311) and the first through hole (111). Further with reference to FIGS. 3, 4 and 10, a hole (321) is defined in a second end of the drive unit (30) for being pivotally sleeved on an input shaft (2). A partition (33) is securely laterally attached to one side of the drive unit (30) and adapted to correspond to the centrifugal lever (4) of seat (1) of the engine clutch. The partition (33) may be integrally formed with the drive unit (30). The partition (33) includes a curved separation (331) extending therefrom and concentrically corresponding with the hole (321). The separation (331) is adapted to drive the second end (5B) of the torsion spring (5) of the engine clutch. A cutout (331A) is defined in a lower portion of the separation (331) for guiding the second end (5B) of the torsion spring (5) engaged to an annular groove (2A) that is defined in an outer periphery of the input shaft (2). Further with reference to FIGS. 8 and 9, a concave (34) is defined in a distal edge of a second end of the drive unit (30) for receiving the position portion (241) when detaching the centrifugal lever (4).

Figure 3:
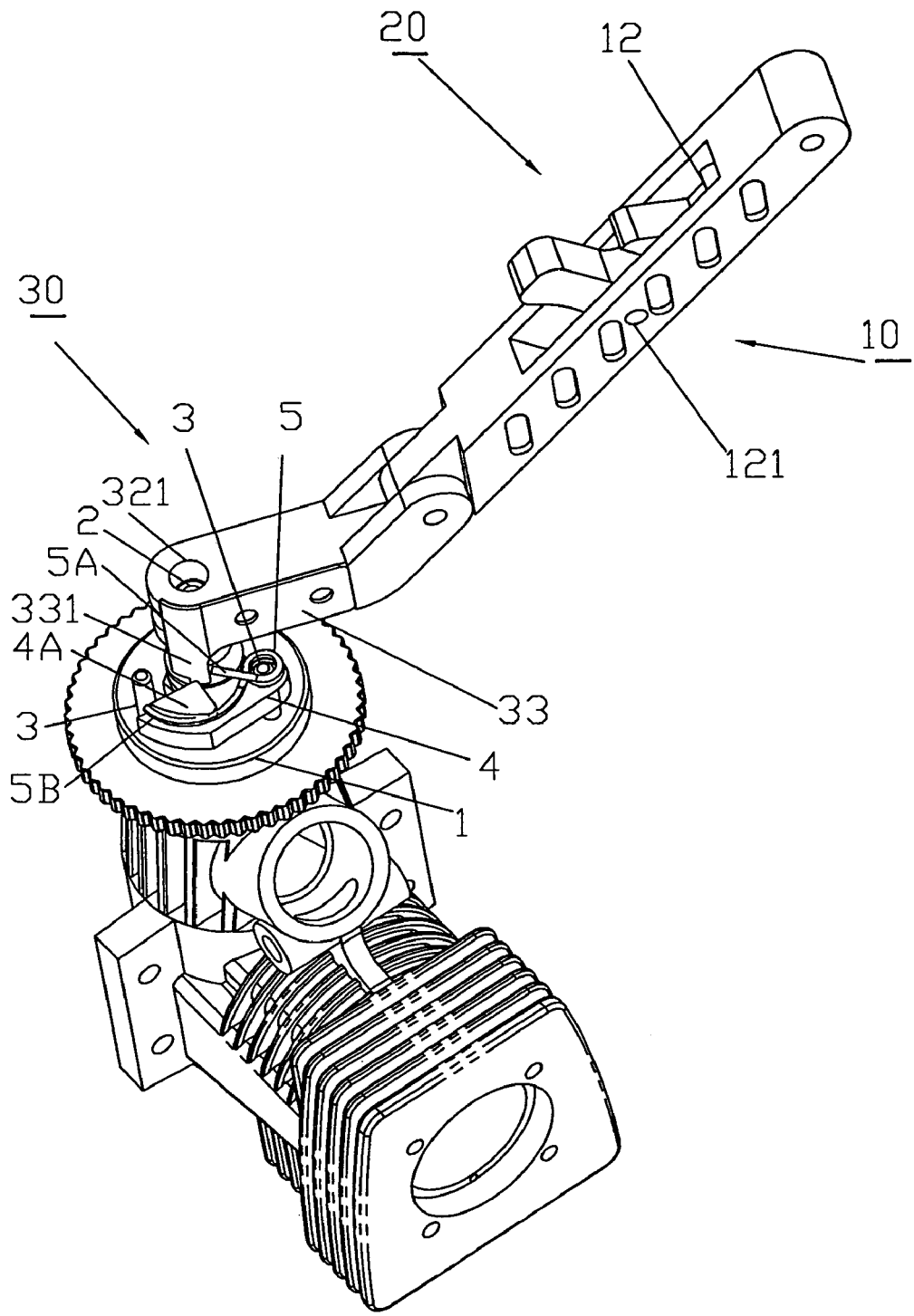
FIG. 3 is a first perspective operational view of the wrench in FIG. 2.
Figure 4:
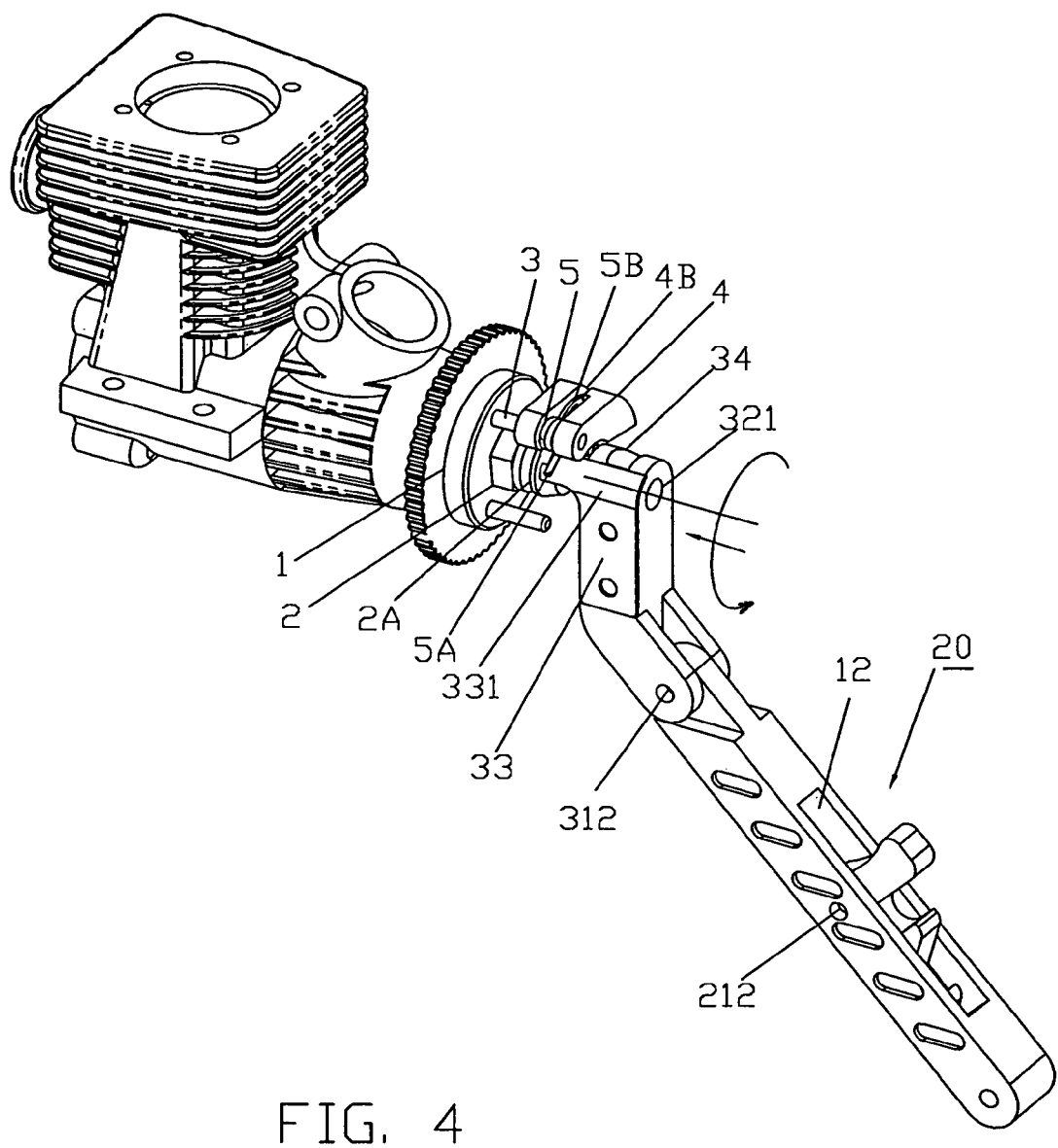
FIG. 4 is a second perspective operational view of the wrench in FIG. 2.
Figure 10:
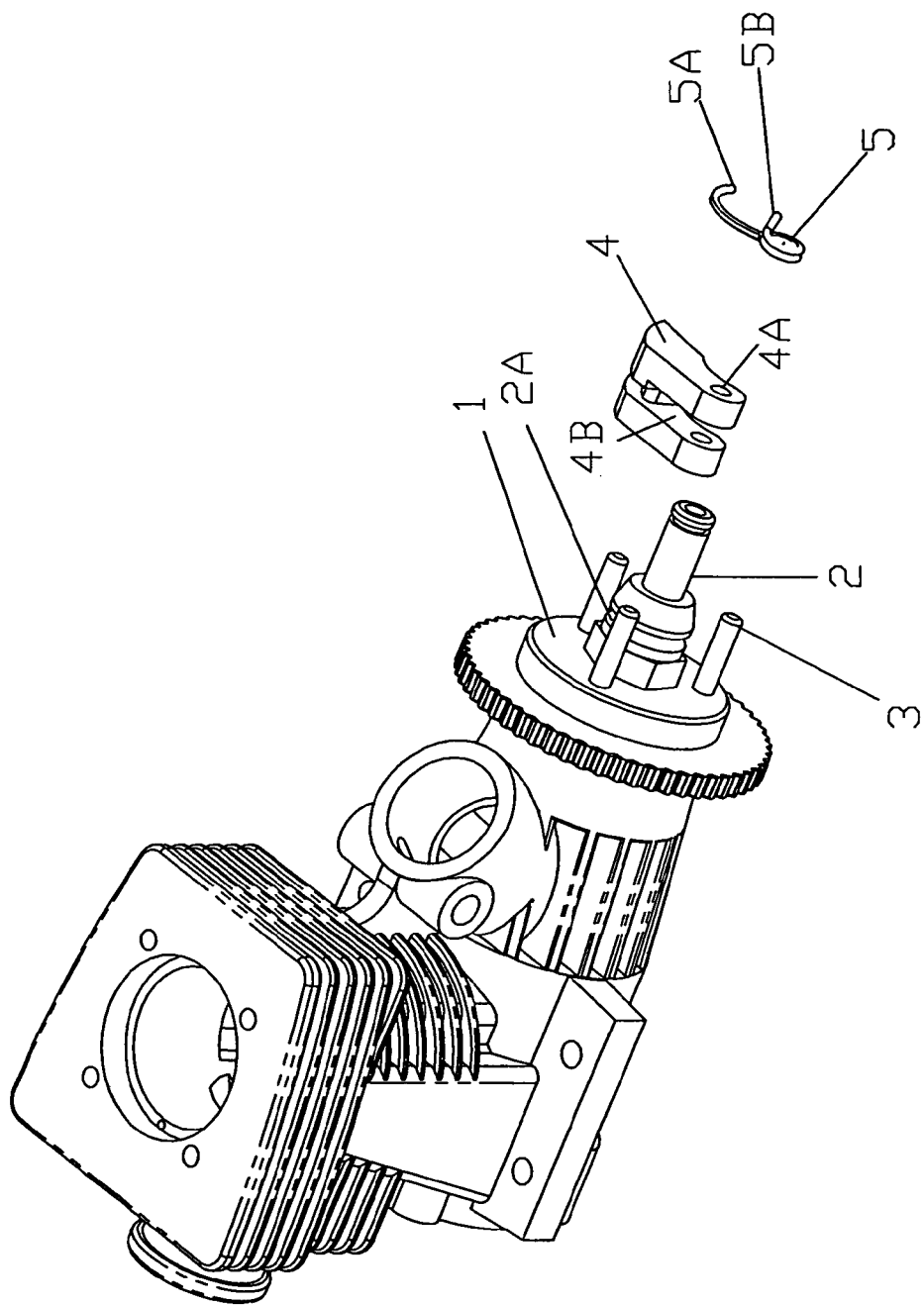
FIG. 10 is an exploded perspective view of an engine clutch of a radio control model.

When mounting the centrifugal lever (4), with reference to FIGS. 3 and 10, the torsion spring (5) is disposed in the slot (4B) in the centrifugal lever (4) and the first end (5A) of the torsion spring (5) abuts against the centrifugal lever (4). Then, the centrifugal lever (4) and the torsion spring (5) are orderly sleeved on the stub (3) of the seat (1) via the through hole (4A) in the centrifugal lever (4).

The hole (321) is adapted to be sleeved on the input shaft (2) and the separation (331) is inserted between hole (321) and the centrifugal lever (4). Further with reference to FIG. 4, the separation (331) abuts against the second end (5B) of the torsion spring (5). Consequently, the second end (5B) of the torsion spring (5) is wrenched to engage to the input shaft (2) by the separation (331) when the drive unit (30) is rotated.

Figure 5:
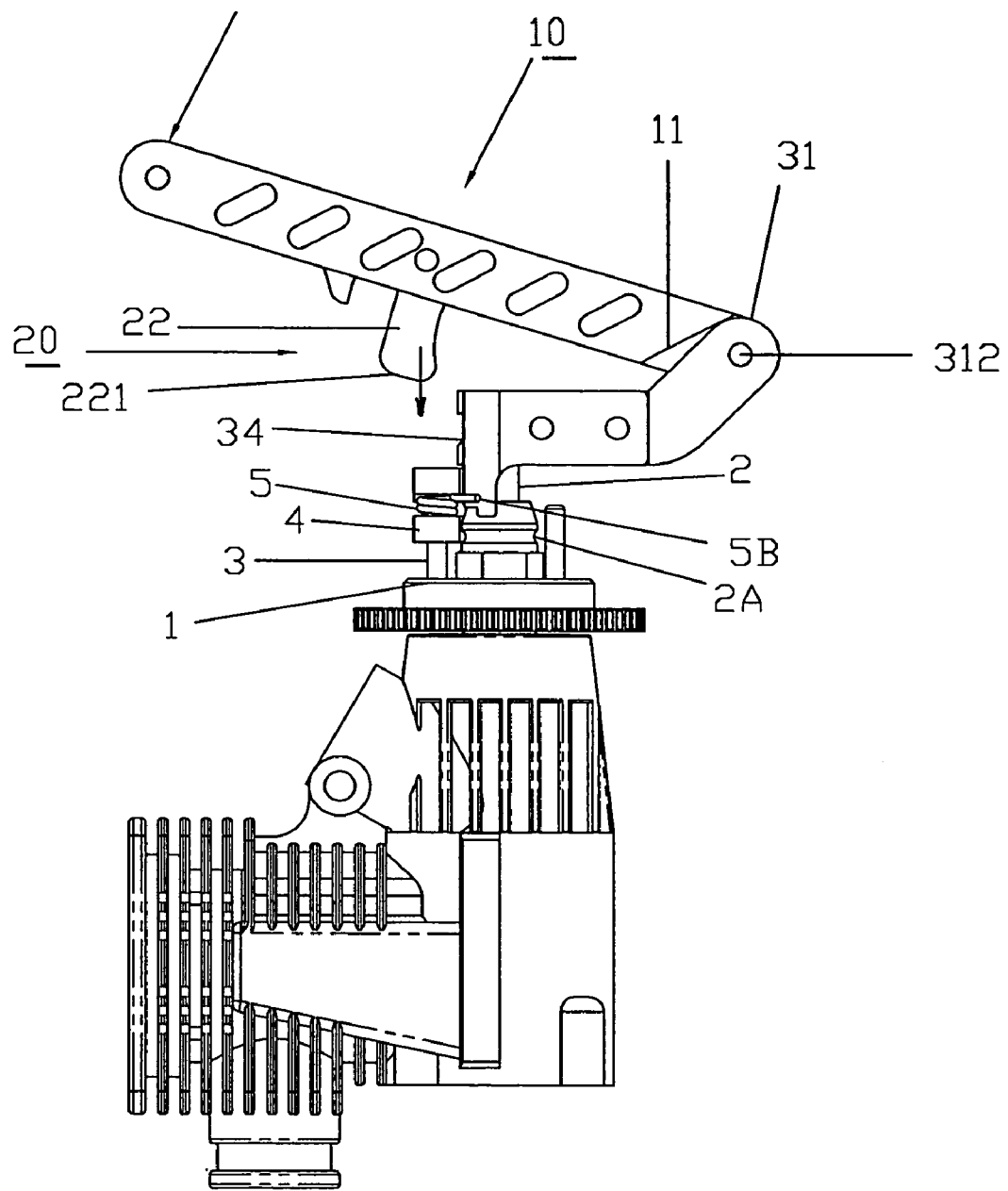
FIG. 5 is a third perspective operational view of the wrench in FIG. 2.
Figure 6:
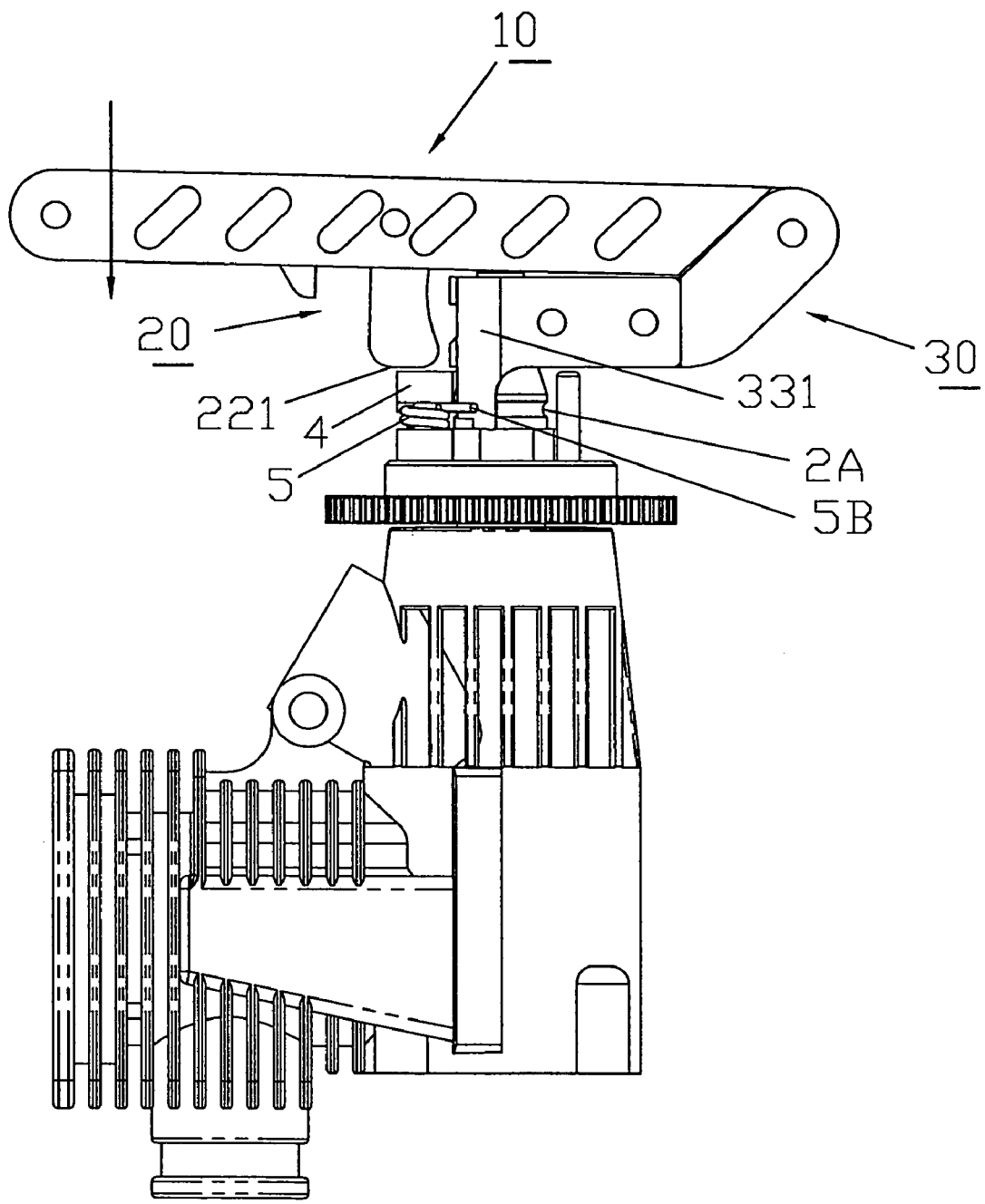
FIG. 6 is a fourth perspective operational view of the wrench in FIG. 2.

As described above, further with reference to FIGS. 5 and 6, the handle (10) is wrenched to make the press portion (221) of the control unit (20) align with the stub (4) on which the centrifugal lever (4) is sleeved. Continually wrenching the handle (10), the centrifugal lever (4) is pressed toward a lower portion of the input shaft (2) and the second end (5B) is moved to correspond to the annular groove (2A) in the input shaft (2). The second end (5B) of the torsion spring (5) is disengaged from the separation (331) and engaged to the annular groove (2A) and the centrifugal lever (4) is completely mounted when further rotating the drive unit (30).

Figure 7:
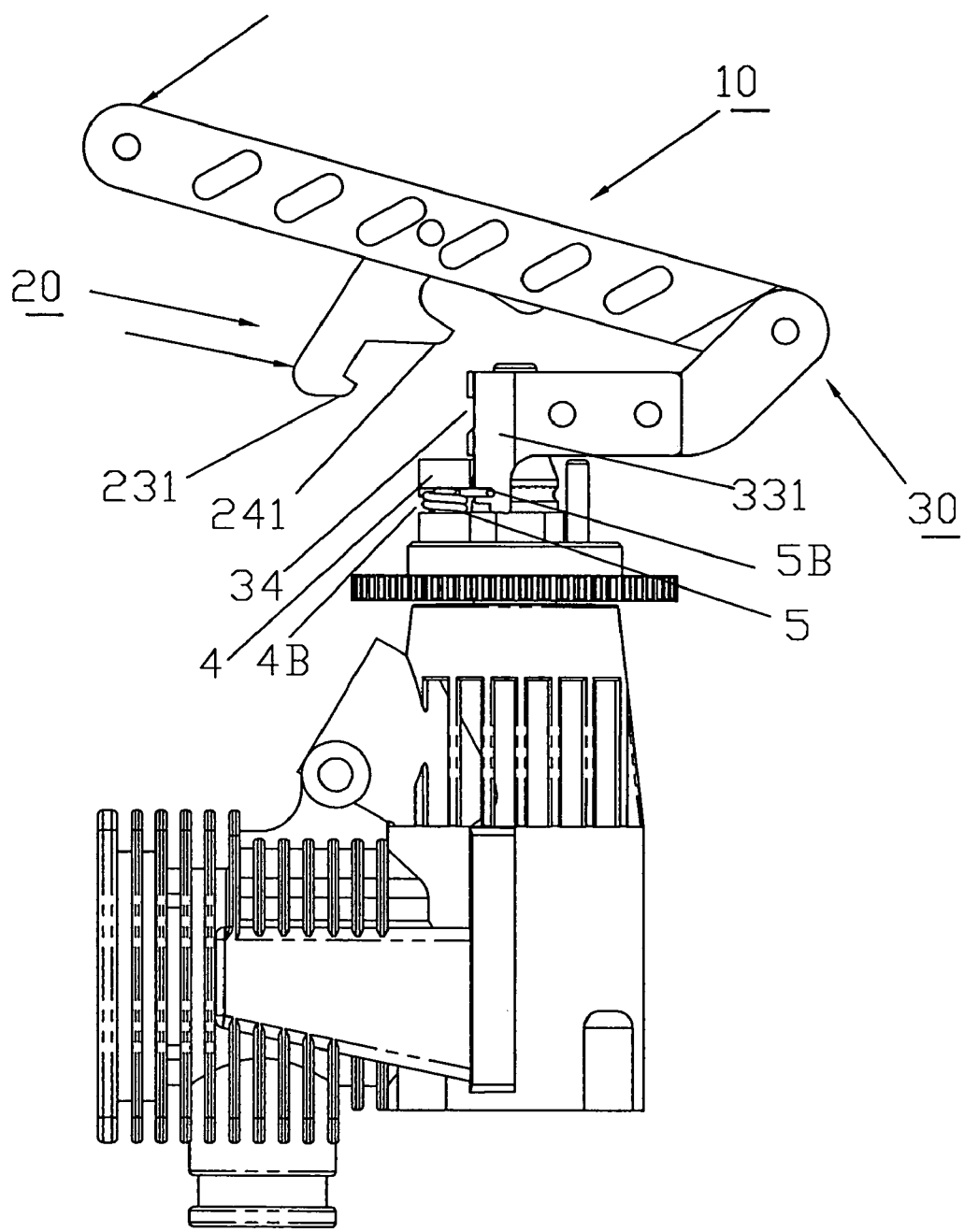
FIG. 7 is a fifth perspective operational view of the wrench in FIG. 2.

With reference to FIGS. 7 and 10, the input shaft (2) is received in the hold (321) in the control unit (30). The separation (331) of the partition (33) is inserted between the hole (321) and the centrifugal lever (4). Then, the drive unit (30) is rotated, and the second end (5B) of the torsion spring (5) is wrenched and disengaged from the annular groove (2A) in the input shaft (2).

Figure 8:
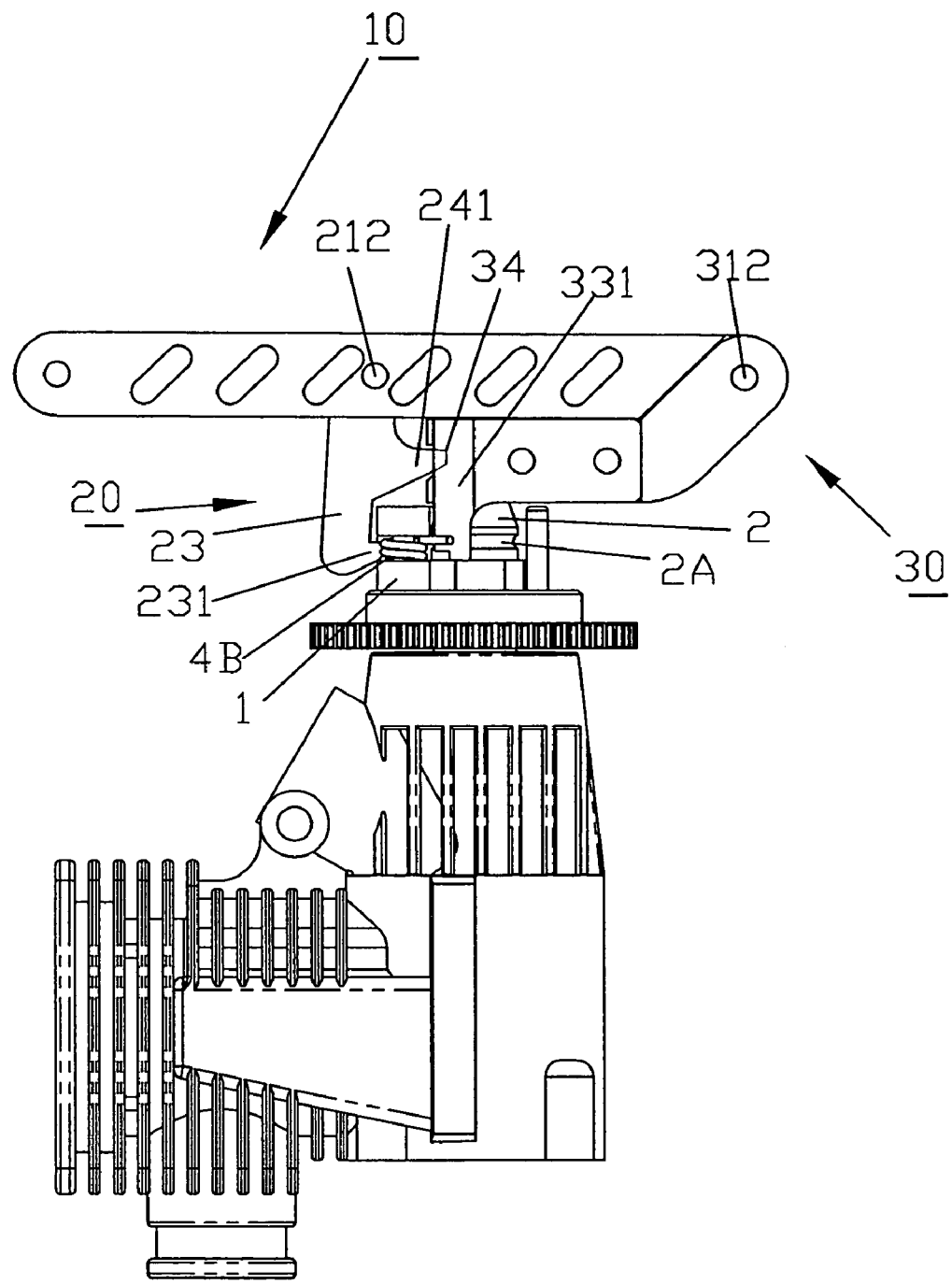
FIG. 8 is a sixth perspective operational view of the wrench in FIG. 2.
Figure 9:
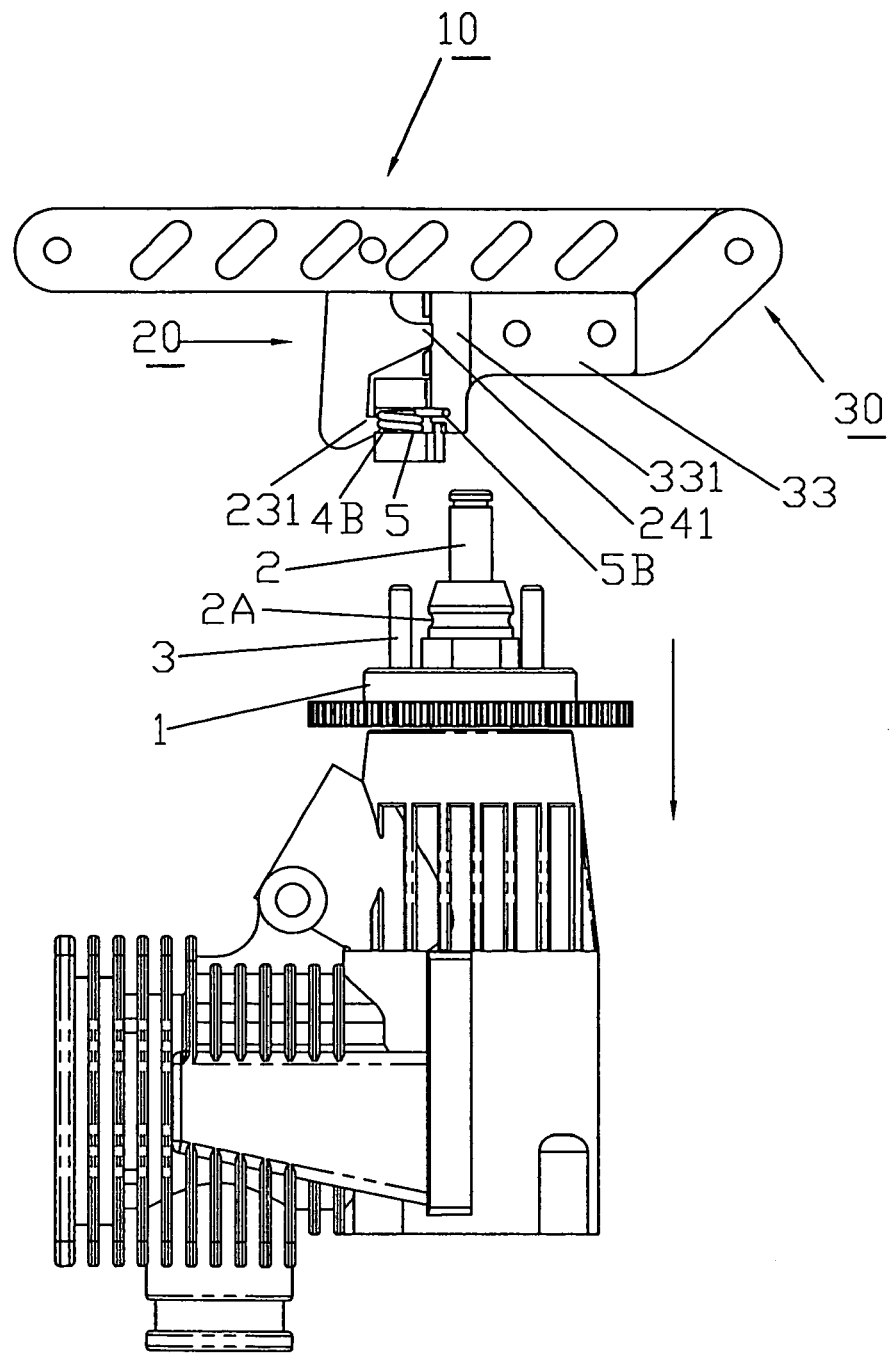
FIG. 9 is a seventh perspective operational view of the wrench in FIG. 2.

Continually, with reference to FIGS. 8 and 9, the control unit (20) is turned and the handle (10) is wrenched to abut the control unit (30). The hook (231) of the control unit (20) is engaged to the slot (4B) in the centrifugal lever (4) and the position portion (241) of the control unit (20) is partially received in the concave (34) of the drive unit (30). Consequently, the wrench in accordance with the present invention is securely engaged to the centrifugal lever (4). Finally, the user holds the handle (10) and the drive unit (30) and can pull the centrifugal lever (4) along an axis of the stub (3).

As described above, the wrench for an engine clutch of a radio control model in accordance with the present invention comprises the following advantages.

1. The control unit (20) and the drive unit (30) are respectively pivotally mounted to the handle (10) such that wrench of the present invention can provide a good vision when being operated.

2. The control unit (20) and the drive unit (30) are respectively pivotally mounted to the handle (10) such that the wrench of the present invention has two functions of mounting and detaching.

3. The control unit (20) is F-shaped. The press portion (221), the hook (231) and the position portion (241) of the control unit (20) fully correspond to the drive unit (30) such that the wrench of the present invention provides a stable operation.

4. The drive unit (30) is pivotally mounted to one end of the handle (10) and can be circled about 180 degrees relative to the handle (10). In addition, the separation (331) is curved and concentrically corresponds to the hold (321) in the drive unit (30) such that the wrench of the present invention is labor-saving and can be conveniently accurately operated.

Although the invention has been explained in relation to its preferred embodiment, it is to be understood that many other possible modifications and variations can be made without departing from the spirit and scope of the invention as hereinafter claimed.

What is claimed is:

1. A wrench for an engine clutch of a radio control model, comprising:
   a handle including a receiving space longitudinally defined in a middle portion of the handle;
   a control unit rotatably mounted in the receiving space in the handle, the control unit including a first end formed with a press portion and a second end formed with a hook, the press portion configured to press a centrifugal lever of the engine clutch when mounting centrifugal lever and the hook configured to engaged to the centrifugal lever of the engine clutch when detaching the centrifugal lever; and
   a drive unit pivotally mounted to one end of the handle and corresponding to the press portion of the control unit, the drive unit including a hole define in a free end of the drive unit and configured to receive an input shaft of the engine clutch, a partition securely laterally attached to the drive unit and having a separation extending from the partition, the separation being curved and concentrically corresponding to the hole in the drive unit for detaching/mounting a torsion spring of the engine clutch.

2. The wrench as claimed in claim 1, wherein the separation comprises a cutout defined therein, the cutout configured to mount the torsion spring and engaged to an annular groove that is defined in an outer periphery of the input shaft.

3. The wrench as claimed in claim 2, wherein the drive unit is capable of being circled about 180 degrees relative to the handle for an operation.

4. The wrench as claimed in claim 3, wherein the control unit is F-shaped and comprises a shank having a first end and second end formed with the hook, a first protrusion perpendicularly extending from the first end of the shank and the press portion formed on a distal end of the first protrusion, a second protrusion extending from a middle portion of the shank and parallel with the first protrusion, a position portion formed on a distal end of the second protrusion for an operation.

5. The wrench as claimed in claim 4, wherein the partition is integrally formed with the drive unit.

6. The wrench as claimed in claim 2, wherein the control unit is F-shaped and comprises a shank having a first end and second end formed with the hook, a first protrusion perpendicularly extending from the first end of the shank and the press portion formed on a distal end of the first protrusion, a second protrusion extending from a middle portion of the shank and parallel with the first protrusion, a position portion formed on a distal end of the second protrusion for an operation.

7. The wrench as claimed in claim 6, wherein the partition is integrally formed with the drive unit.

8. The wrench as claimed in claim 2, wherein the partition is integrally formed with the drive unit.

9. The wrench as claimed in claim 1, wherein the drive unit is capable of being circled about 180 degrees relative to the handle for an operation.

10. The wrench as claimed in claim 9, wherein the control unit is F-shaped and comprises a shank having a first end and second end formed with the hook, a first protrusion perpendicularly extending from the first end of the shank and the press portion formed on a distal end of the first protrusion, a second protrusion extending from a middle portion of the shank and parallel with the first protrusion, a position portion formed on a distal end of the second protrusion for an operation.

11. The wrench as claimed in claim 10, wherein the partition is integrally formed with the drive unit.

12. The wrench as claimed in claim 9, wherein the partition is integrally formed with the drive unit.

13. The wrench as claimed in claim 1, wherein the control unit is F-shaped and comprises a shank having a first end and second end formed with the hook, a first protrusion perpendicularly extending from the first end of the shank and the press portion formed on a distal end of the first protrusion, a second protrusion extending from a middle portion of the shank and parallel with the first protrusion, a position portion formed on a distal end of the second protrusion for an operation.

14. The wrench as claimed in claim 13, wherein the partition is integrally formed with the drive unit.

15. The wrench as claimed in claim 1, wherein the partition is integrally formed with the drive unit.

* * * * *